(12) United States Patent
Watanabe et al.

(10) Patent No.: US 9,547,545 B2
(45) Date of Patent: Jan. 17, 2017

(54) APPARATUS AND PROGRAM FOR DETECTING ABNORMALITY OF A SYSTEM

(71) Applicant: Fujitsu Limited, Kawasaki-shi, Kanagawa (JP)

(72) Inventors: Yukihiro Watanabe, Kawasaki (JP); Yasuhide Matsumoto, Kawasaki (JP); Atsuji Sekiguchi, Kawasaki (JP); Masazumi Matsubara, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 410 days.

(21) Appl. No.: 14/078,699

(22) Filed: Nov. 13, 2013

(65) Prior Publication Data

US 2014/0068356 A1 Mar. 6, 2014

Related U.S. Application Data

(63) Continuation of application No. PCT/JP2011/061760, filed on May 23, 2011.

(51) Int. Cl.
*G06F 11/00* (2006.01)
*G06F 11/07* (2006.01)

(52) U.S. Cl.
CPC ....... *G06F 11/0766* (2013.01); *G06F 11/0706* (2013.01); *G06F 11/0751* (2013.01); *G06F 11/0757* (2013.01)

(58) Field of Classification Search
CPC .................................................. G06F 11/0766
See application file for complete search history.

(56) References Cited

U.S. PATENT DOCUMENTS

| | | | | |
|---|---|---|---|---|
| 7,409,423 | B2 * | 8/2008 | Horvitz | G06Q 10/109 706/21 |
| 8,024,415 | B2 * | 9/2011 | Horvitz | G05B 19/404 709/206 |
| 8,166,392 | B2 * | 4/2012 | Horvitz | G06Q 10/107 715/255 |
| 8,775,186 | B2 * | 7/2014 | Shin | A61B 5/16 455/414.1 |

(Continued)

FOREIGN PATENT DOCUMENTS

| | | |
|---|---|---|
| JP | 8-139722 | 5/1996 |
| JP | 9-114703 | 5/1997 |

(Continued)

OTHER PUBLICATIONS

European Search Report dated Sep. 28, 2015 for corresponding European Patent Application No. 11866262.6, 6 pages.

(Continued)

*Primary Examiner* — Christopher McCarthy
(74) *Attorney, Agent, or Firm* — Fujitsu Patent Center

(57) ABSTRACT

A message determination apparatus includes a storage unit that stores messages generated in a system, an extracting unit that extracts a message whose occurrence interval is in a certain range from the messages stored on the storage unit, and a determining unit that determines whether the occurrence interval of the message extracted at the extracting unit is out of a certain range in the messages generated in the system. Accordingly, a fault on the system can be detected when the occurrence interval is out of a certain range.

6 Claims, 14 Drawing Sheets

(56) References Cited

U.S. PATENT DOCUMENTS

| | | | |
|---|---|---|---|
| 8,892,674 B2* | 11/2014 | Horvitz | G06Q 10/107 |
| | | | 709/206 |
| 8,935,347 B2* | 1/2015 | Cohen | H04L 12/587 |
| | | | 455/412.1 |
| 2003/0028680 A1 | 2/2003 | Jin | |
| 2006/0256714 A1 | 11/2006 | Takagi | |
| 2009/0282420 A1* | 11/2009 | Fujita | G06F 9/546 |
| | | | 719/314 |
| 2010/0223499 A1 | 9/2010 | Panigrahy et al. | |
| 2010/0281397 A1* | 11/2010 | Buchheit | G06Q 10/107 |
| | | | 715/752 |
| 2013/0246613 A1* | 9/2013 | Kawaba | H04L 43/10 |
| | | | 709/224 |
| 2013/0275048 A1* | 10/2013 | Hong | G06F 17/00 |
| | | | 702/19 |
| 2014/0013207 A1* | 1/2014 | Wu | H04L 12/1827 |
| | | | 715/234 |
| 2015/0026801 A1* | 1/2015 | Rossigneux | H04L 63/1425 |
| | | | 726/22 |
| 2015/0142385 A1* | 5/2015 | Otsuka | G06F 11/0706 |
| | | | 702/182 |
| 2015/0264713 A1* | 9/2015 | Amemiya | H04W 74/04 |
| | | | 370/336 |
| 2016/0021049 A1* | 1/2016 | Virtanen | H04L 12/589 |
| | | | 709/206 |

FOREIGN PATENT DOCUMENTS

| | | |
|---|---|---|
| JP | 11-224214 | 8/1999 |
| JP | 2006-318071 | 11/2006 |
| JP | 2006-331026 | 12/2006 |
| JP | 2007-096835 | 4/2007 |
| JP | 2010-86160 A | 4/2010 |

OTHER PUBLICATIONS

Japanese Office Action mailed Nov. 4, 2014 for corresponding Japanese Patent Application No. 2013-516095, with Partial English Translation, 5 pages.

International Search Report, mailed in connection with PCT/JP2011/061760 and mailed Jun. 21, 2011.

\* cited by examiner

FIG.5A

"Mar 30 10:22:22 localhost app1: [AP020S001] unknown error occurred."
                                  MESSAGE TYPE ID

FIG.5B

ID    Regular Expression
001   "^\S+ \d+ \d{2}:\d{2}:\d{2} \S+ app1: .+ unknown error occurred\.$"
002   "^\S+ \d+ \d{2}:\d{2}:\d{2} \S+ app1: .+ network connection closed\.$"

FIG.5C

IN LEARNING DICTIONARY:
ID    Message
001   "Feb 12 9:07:10 localhost app1: [AP020S001] unknown error occurred."
002   "Feb 22 21:00:25 localhost web2: [W022D025] server started."

INPUT: "Mar 30 10:22:22 localhost app1: [AP020S001] unknown error occurred."

MATCH:
  001 SIX WORDS OUT OF NINE WORDS = 66.666%
  002 ONE WORD OUT OF NINE WORDS = 11.11%
WHEN REFERENCE VALUE IS 60%, THIS INPUT IS SORTED AS ID "001"

MO

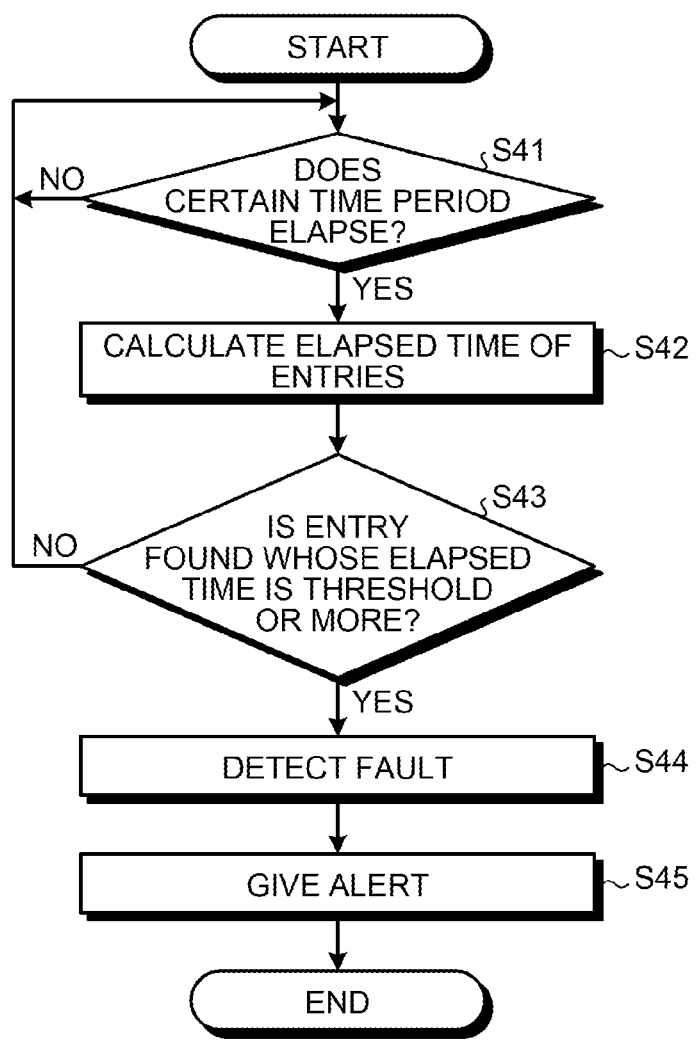

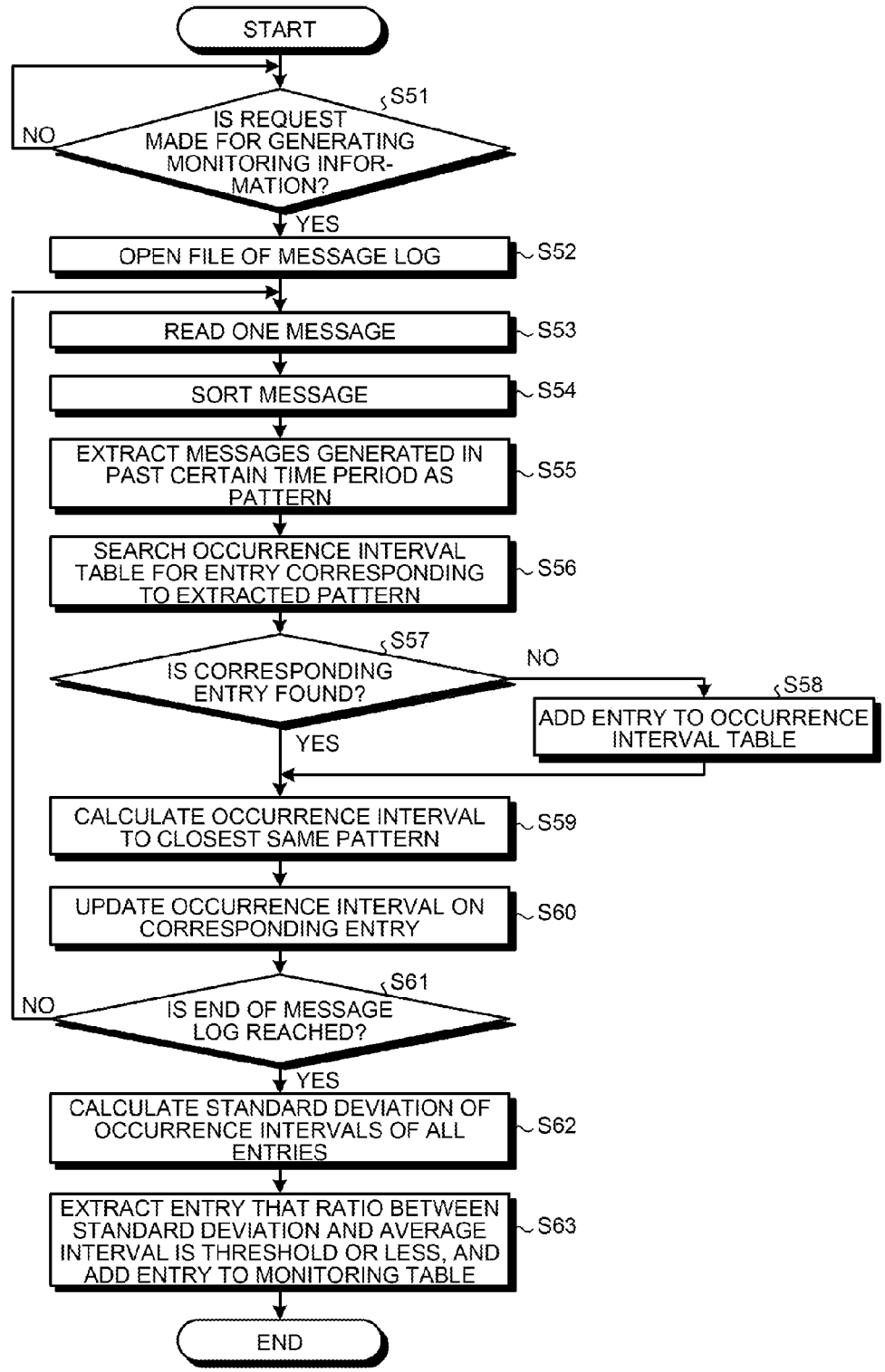

APPARATUS AND PROGRAM FOR DETECTING ABNORMALITY OF A SYSTEM

CROSS-REFERENCE TO RELATED APPLICATION

This application is a continuation application of International Application PCT/JP2011/061760, filed on May 23, 2011, and designating the U.S., the entire contents of which are incorporated herein by reference.

FIELD

The present invention relates to a message determination apparatus, for example.

BACKGROUND

Heretofore, in a computer system that manages operations based on messages, the computer system outputs a message related to an abnormality when a device, an application, or the like in the system is abnormally operated. A management apparatus that manages operations monitors messages outputted in abnormal operation, and detects an abnormality on the system.

Moreover, the management apparatus monitors messages outputted from the device, the application, or the like in the system in normal operation separately from messages outputted in abnormal operation, and detects an abnormality on the system. In the monitoring and detection, an administrator that manages operations manually defines messages targeted for monitoring as rules on the operation in correspondence to the device configuration of the system, the operation of the system, and the like. Thus, the management apparatus can monitor messages targeted for monitoring defined in the rules, and can detect an abnormality on the system based on the rules on the operation.

Here, there is a technique to monitor messages for detecting an abnormality. In the technique, a management apparatus stores normal patterns. The normal pattern is combinations of one or two or more of continuous messages generated in the case where a distributed system is normally operated, and includes elements that are identifiers to uniquely identify the messages and the occurrence numbers of messages indicated by the identifiers. The management apparatus then makes reference to normal patterns, searches for an identifier matched with the identifier of the collected message, and counts the occurrence number of the message, which is indicated by the identifier, in the case where the corresponding identifier exists. The management apparatus then determines an abnormality in the case where the counted occurrence number of the message is a predefined value or less.

Moreover, there is a technique in which events are monitored to detect the throughput of a CPU (Central Processing Unit). In the technique, in the case where a packet destination is directed to a different device, a relay-equipped device monitors the occurrence interval between events that are generated on a regular basis, and determines the throughput of the CPU depending on whether the occurrence interval between the monitored events exceeds a predetermined interval. The device then detects that the CPU does not have enough remaining power in the case where the occurrence interval between the events exceeds a predetermined interval.

Furthermore, there is a technique in which an FCS (Frame Check Sequence) error frame (in the following, referred to as an error frame) is detected to find a fault on a network system. In the technique, a fault prediction device calculates the number of bits between error frames that is the total number of bits of frames transmitted on a transmission line between an error frame and a subsequent error frame. The fault prediction device then compares the calculated number of bits with a threshold calculated based on the number of bits transmitted in correspondence to the occurrence rate of bit errors on the transmission line statistically spontaneously produced, and detects a fault on the network system. The fault prediction device then determines that a fault occurs on the network system when the calculated number of bits is smaller than the threshold.

Patent Literature 1: Japanese Laid-open Patent Publication No. 2007-96835
Patent Literature 2: Japanese Laid-open Patent Publication No. 11-224214
Patent Literature 3: Japanese Laid-open Patent Publication No. 08-139722
Patent Literature 4: Japanese Laid-open Patent Publication No. 2006-318071

SUMMARY

However, the management apparatus has a problem in that it is sometimes difficult to detect an abnormality on the system.

For example, in the case where an abnormality occurs on a device in the system, it is difficult for the device with the abnormality to correctly output messages. Namely, it is difficult for the device with the abnormality to output messages that are outputted in normal operation, or to output messages at timing at which messages are supposed to be outputted in normal operation. Moreover, the device with the abnormality does not always output a message related to an abnormality on all abnormalities. This means that even though the administrator defines messages and the like, which are targeted for monitoring, as the rules on the operation, it is sometimes difficult for the management apparatus to detect abnormalities using the defined rules.

Furthermore, it is difficult for the administrator to define the rules on the operation. Namely, in order that the administrator manually defines the rules on the operation, it is desirable for the administrator to have sufficient knowledge on the device configuration of the system, the operation of the system, etc. Additionally, it is sometimes difficult for the administrator to obtain sufficient knowledge in the case where the administrator takes over the operation from another administrator, for example. This means that since it is difficult for the administrator to manually define the rules on the operation, it is difficult for the management apparatus to detect abnormalities.

Moreover, for example, in the case where the device configuration of the system frequently changes like a system in cloud computing, since it is difficult for the administrator to define the rules on the operation, it is more difficult for the management apparatus to detect abnormalities.

Even in the previously existing techniques that monitor messages to detect faults, the administrator predefines values for comparison with the counted occurrence number, intervals for comparison with the occurrence interval of events, and error frames used for detecting faults, for example, as the rules on the operation. This means that the management apparatus still has a problem in that it is sometimes difficult to detect abnormalities.

According to an aspect of an embodiment, a message determination apparatus includes • a processor and a memory. The processor executes storing messages generated in a system, extracting a message whose occurrence interval is in a certain range from the messages stored at the storing and determining whether an occurrence interval of the message extracted at the extracting is out of the certain range in the messages generated in the system.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 5A is a diagram of an exemplary message sorting method (a message type ID method).

FIG. 5B is a diagram of another exemplary message sorting method (a regular expression method).

FIG. 5C is a diagram of still another exemplary message sorting method (a similarity determination method).

FIG. 7B is a flowchart of the process procedures of detecting a fault in the case where a message supposed to be generated is not generated or in the case where a message is generated after a time period longer than a normal time period.

FIG. 13 is a flowchart of the process procedures of generating monitoring information according to the third embodiment.

DESCRIPTION OF EMBODIMENTS

In the following, embodiments of a message determination apparatus and a message determination program disclosed in the present application will be described in detail with reference to the drawings. It is noted that the present invention is not limited to the embodiments.

First Embodiment

Figure 1:
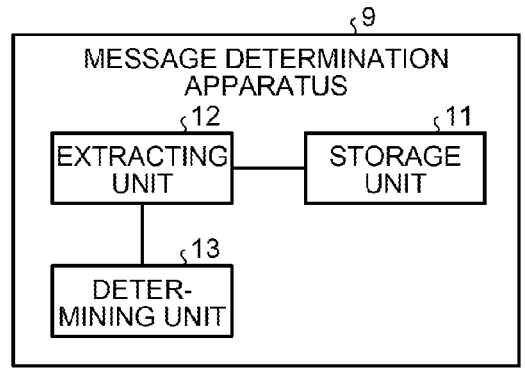
FIG. 1 is a functional block diagram of the configuration of a message determination apparatus according to a first embodiment.

FIG. 1 is a functional block diagram of the configuration of a message determination apparatus according to a first embodiment. As illustrated in FIG. 1, a message determination apparatus 9 includes a storage unit 11, an extracting unit 12, and a determining unit 13. For the message determination apparatus 9, a management terminal is named, which manages an overall system including devices such as a PC (Personal Computer). Moreover, the message determination apparatus 9 is connected to the devices such as a PC, for example, in the system via a network. The devices in the system output messages generated in abnormal operation and normal operation to the message determination apparatus 9.

The storage unit 11 stores messages generated in the system. The extracting unit 12 extracts a message whose occurrence interval is in a certain range from the messages stored on the storage unit 11.

The determining unit 13 determines whether the occurrence interval of the message extracted at the extracting unit 12 is out of a certain range in the messages generated in the system.

As described above, the message determination apparatus 9 extracts a message whose occurrence interval is in a certain range from the messages generated in the system, so that the message determination apparatus 9 can detect an abnormality on the system using the extracted message for determining the occurrence interval of a message.

Second Embodiment

[Configuration of a Management Apparatus according to a Second Embodiment]

Next, a second embodiment will be described. In the second embodiment, the case will be described where a management apparatus that monitors messages outputted from devices in a network system is adopted for an exemplary message determination apparatus.

Figure 2:
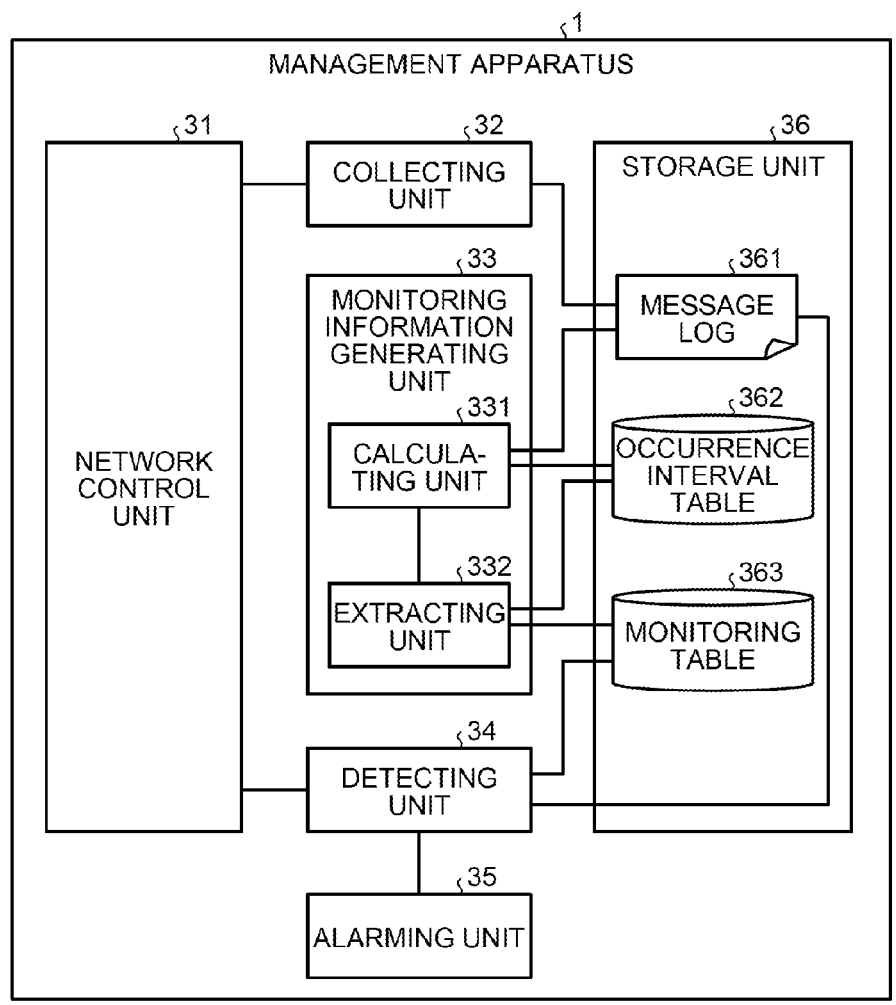
FIG. 2 is a functional block diagram of the configuration of a management apparatus according to the first embodiment.

FIG. 2 is a functional block diagram of the configuration of a management apparatus according to the second embodiment. As illustrated in FIG. 2, a management apparatus 1 includes a network control unit 31, a collecting unit 32, a monitoring information generating unit 33, a detecting unit 34, an alarming unit 35, and a storage unit 36.

The storage unit 36 includes a message log 361, an occurrence interval table 362, and a monitoring table 363. It is noted that the storage unit 36 is a semiconductor memory device such as a RAM (Random Access Memory) and a flash memory (flash memory), or a storage device such as a hard disk and an optical disk, for example.

The network control unit 31 communicates with devices through a network. Here, the network control unit 31 communicates with devices in the network system, and receives messages outputted from the devices. It is noted that the network may be a cabled network or a wireless network, which may be a network via which the network control unit 31 communicates with the devices in the network system.

The collecting unit 32 receives a message received at the network control unit 31 in operating the network system, and collects the received message. The collecting unit 32 then stores the collected message on the message log 361 that stores the occurrence history of messages. The messages to be collected at the collecting unit 32 mean messages outputted from the devices in the network system, and include important messages and unimportant messages. Important messages referred here are messages to be targeted for monitoring in detecting a fault on the system, whereas unimportant messages are messages other than important messages. It is noted that the detail of a method for extracting a message to be targeted for monitoring will be described later.

The monitoring information generating unit 33 analyzes the message log 361, and generates monitoring information that is information for use in detecting a fault on the system. The monitoring information includes a threshold that determines whether a message is a message to be targeted for monitoring, or a threshold that determines whether to be a fault. Namely, the monitoring information includes information that defines rules on the operation. It is noted that the monitoring information generating unit 33 updates monitoring information in certain time periods or at irregular intervals, and generates information in correspondence to the latest device configuration of the network system. An example of a certain time period may be an hour or a day. Moreover, an example of an irregular interval may be time at which the device configuration is changed or time at which a device is added.

Furthermore, the monitoring information generating unit 33 includes a calculating unit 331 and an extracting unit 332.

The calculating unit 331 analyzes the message log 361, and calculates an occurrence interval for individual message types. For example, the calculating unit 331 selects messages one by one in ascending order from the oldest time instant from the messages stored on the message log 361, and sorts the selected messages. For example, the specific field of a message is allocated to an ID (IDentification) indicating a message type, and the calculating unit 331 sorts the ID allocated to the specific field of the selected message as the message type of the selected message. It is noted that the detail of a message sorting method will be described later.

In addition, the calculating unit 331 searches the occurrence interval table 362 that manages the occurrence intervals for individual message types for an entry corresponding to the sorted message type. In the case where the calculating unit 331 unsuccessfully searches for the corresponding entry, the calculating unit 331 adds an entry related to the selected message to the occurrence interval table 362. On the other hand, in the case where the calculating unit 331 successfully searches for the corresponding entry, the calculating unit 331 calculates an occurrence interval between the sorted message and a same type message whose occurrence time instant is the closest to the occurrence time instant of the sorted message based on the messages stored on the message log 361. The calculating unit 331 then updates information related to the calculated occurrence interval on the corresponding entry on the occurrence interval table 362. For example, the calculating unit 331 adds one to the occurrence number in correspondence to the message type of the corresponding entry on the sorted message, and updates the added occurrence number. In this case, the calculating unit 331 temporarily holds the occurrence interval on the storage unit 36 in association with the message type of the corresponding entry. This is because the calculating unit 331 sorts the messages from the beginning to the end of the message log 361 and calculates the occurrence intervals, and then calculates the average interval and standard deviation of the occurrence intervals of the sorted messages.

The calculating unit 331 then repeats the processes of sorting the messages from the beginning to the end of the message log 361 and calculating occurrence intervals. The calculating unit 331 processes the messages to the end of the message log 361, and then calculates the average interval of the occurrence intervals in correspondence to the message type based on the occurrence intervals temporarily held in association with the occurrence numbers and the message types stored on the occurrence interval table 362. Moreover, the calculating unit 331 calculates the variance of the occurrence intervals in correspondence to the message type using the calculated average interval and the occurrence intervals temporarily held, and calculates a standard deviation from the calculated variance. The calculating unit 331 then updates the calculated standard deviation on the corresponding entry in correspondence to the message type on the occurrence interval table 362.

It is noted the description is given in which the calculating unit 331 selects messages one by one in ascending order from the oldest time instant from the messages stored on the message log 361. However, the configuration is not limited thereto. Such a configuration may be possible in which the calculating unit 331 selects messages one by one in descending order from the latest time instant.

Figure 3:
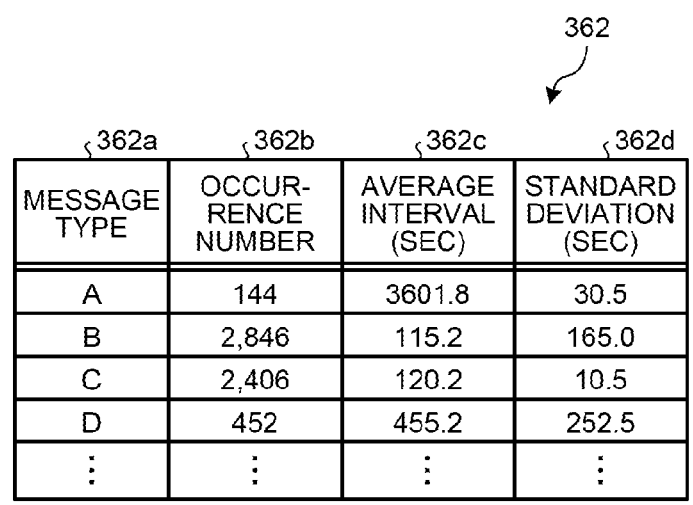
FIG. 3 is a diagram of an exemplary data structure of an occurrence interval table according to the first embodiment.

Here, the data structure of the occurrence interval table 362 will be described with reference to FIG. 3. FIG. 3 is a diagram of an exemplary data structure of the occurrence interval table according to the second embodiment. As illustrated in FIG. 3, the occurrence interval table 362 stores an occurrence number 362$b$, an average interval 362$c$, and a standard deviation 362$d$ in association with individual message types 362$a$. The message type 362$a$ indicates message types. For the message type 362$a$, an ID (a message type ID) uniquely indicating a message, for example, can be used. The occurrence number 362$b$ indicates the occurrence number of a message corresponding to the message type 362$a$. The average interval 362$c$ indicates the average of the occurrence intervals corresponding to the message type 362$a$. The standard deviation 362$d$ indicates the standard deviation of the occurrence interval corresponding to the message type 362$a$. For example, in the case where the message type 362$a$ is "C", "2,406" is stored for the value of the occurrence number 362$b$, "120.2" seconds is stored for the value of the average interval 362$c$, and "10.5" seconds is stored for the value of the standard deviation 362$d$.

The extracting unit 332 extracts a message whose occurrence interval is in a certain range for a monitoring target. For example, the extracting unit 332 extracts a message type that variations in the occurrence intervals from the average interval fall within a certain range based on the average intervals indicating the average of the occurrence intervals and the standard deviations stored on the occurrence interval table 362. The messages in the extracted type are targeted for monitoring. For example, the extracting unit 332 extracts a message type that a quotient when the standard deviation is divided by the average interval is "0.1" or less, which indicates a certain range. Namely, 10% or less of the average interval is a certain range. The extracting unit 332 then stores an entry corresponding to the extracted message type on the monitoring table 363 that manages the message type targeted for monitoring. It is noted that the extracting unit 332 extracts a message that a quotient when the standard deviation is divided by the average interval is smaller than "0.1". However, the configuration is not limited thereto. Such a configuration may be possible in which the extracting unit 332 extracts a message having a value smaller than a value in correspondence to the device configuration of the system or the operation of the system.

Figure 4:
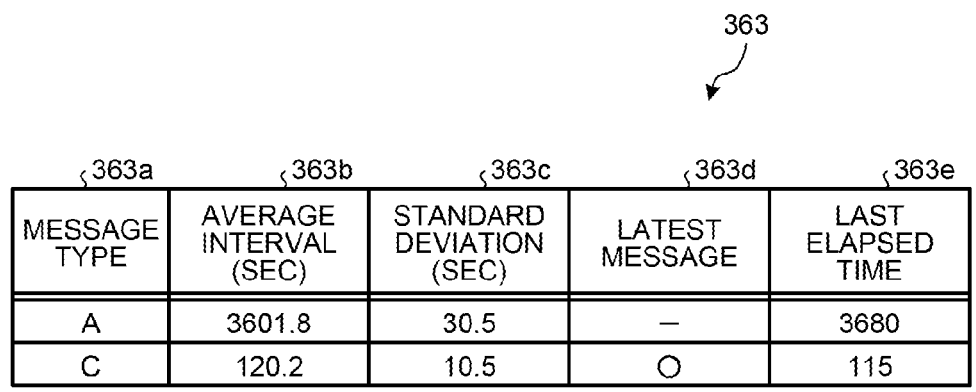
FIG. 4 is a diagram of an exemplary data structure of a monitoring table according to the first embodiment.

Here, the data structure of the monitoring table 363 will be described with reference to FIG. 4. FIG. 4 is a diagram of an exemplary data structure of the monitoring table according to the second embodiment. As illustrated in FIG. 4, the monitoring table 363 stores an average interval 363$b$, a standard deviation 363$c$, a latest message 363$d$, and a last elapsed time 363$e$ in association with individual message types 363$a$. The message type 363$a$ indicates message types targeted for monitoring. The average interval 363$b$ indicates the average of the occurrence intervals corresponding to the message type 363$a$. The standard deviation 363$c$ indicates the standard deviation of the occurrence interval corresponding to the message type 363$a$. The latest message 363$d$ indicates a message generated most recently. For the latest message 363$d$, for example, "a circle" can be used in the case where a message is generated most recently, whereas "a dash" can be used in the case where no message is generated most recently. The last elapsed time 363$e$ indicates an elapsed time from a time instant at which the last message is generated to the present time instant on the same type messages. For example, in the case where the message type 363$a$ is "C", "120.2" seconds is stored for the value of the average interval 363$b$, "10.5" seconds is stored for the value of the standard deviation 363$c$, "a circle" is stored for the latest message 363$d$, and "115" seconds is stored for the last elapsed time 363$e$. The detecting unit 34 receives a message received at the network control unit 31. When the received message is a message targeted for monitoring extracted at the extracting unit 332, the detecting unit 34 monitors the occurrence interval of the message targeted for monitoring. In the case where the occurrence interval of the message targeted for monitoring is out of a certain range in correspondence to a certain range for the corresponding message targeted for monitoring, the detecting unit 34 detects the case as a fault on the network system. In the case where the occurrence interval is out of the certain range, this case is sorted into the case where a message is generated in a time period shorter than a normal time period and the case where a message supposed to be generated is not generated or the case where a message is generated after a time period longer than a normal time period.

First, the case where a message is generated in a time period shorter than a normal time period will be described. For example, when the detecting unit 34 receives a message, the detecting unit 34 sorts the received message. It is noted that for a sorting method, it is supposed to use a method similar to the method for sorting messages at the calculating unit 331. The detecting unit 34 then searches the monitoring table 363 for an entry corresponding to the sorted message type. In the case where the detecting unit 34 successfully searches for the entry, the detecting unit 34 calculates the elapsed time of the corresponding entry based on the messages stored on the message log 361. Namely, the detecting unit 34 calculates an elapsed time from a time instant of a message in the same entry closest to the time instant of the received message to the time instant of the received message. The detecting unit 34 then determines whether the calculated elapsed time is a threshold or less. In the case where the calculated elapsed time is the threshold or less, the detecting unit 34 then determines that the message is generated in a time period shorter than a normal time period, and detects the case as a fault on the network system.

Next, the case where a message supposed to be generated is not generated or the case where a message is generated after a time period longer than a normal time period will be described. For example, the detecting unit 34 calculates an elapsed time from a time instant at which the last message is generated to the present time instant using information about the messages stored on the message log 361 on the messages in a plurality of entries stored on the monitoring table 363. The detecting unit 34 then determines whether the calculated elapsed time is a threshold or more. In the case where the calculated elapsed time is the threshold or more, the detecting unit 34 then determines that a message supposed to be generated is not generated or the message is generated after a time period longer than a normal time period, and detects the case as a fault on the network system.

Here, exemplary thresholds will be described. The threshold is determined for individual message types. For the threshold, the upper and lower limits of the occurrence interval including about 95% of the occurrence intervals of a plurality of messages generated for the individual message types can be used. In other words, as expressed in Expression (1), an occurrence interval X is from a value in which a value that a standard deviation is multiplied by two is subtracted from an average interval to a value in which the value that the standard deviation is multiplied by two is added to the average interval, and the occurrence interval X includes about 95% of occurrence intervals between messages in the messages related to the entries on the occurrence interval table 362.

$$\text{average interval} - \text{standard deviation} \times 2 < \text{occurrence interval } X < \text{average interval} + \text{standard deviation} \times 2 \quad (1).$$

Therefore, the occurrence intervals exceeding about 95% are considered to be a fault on the system. Thus, the lower limit can be used for the threshold in the case where a message is generated in a time period shorter than a normal time period. On the other hand, the upper limit can be used for the threshold in the case where a message supposed to be generated is not generated or in the case where a message is generated after a time period longer than a normal time period.

When the detecting unit 34 detects a fault, the alarming unit 35 gives a warning that a fault is detected by displaying a warning on a display, or by sending an e-mail to a predetermined e-mail address, for example.

[Message Sorting Method]

Next, a message sorting method will be described with reference to FIGS. 5A to 5C. FIG. 5A is a diagram of an exemplary message sorting method (a message type ID method). As illustrated in FIG. 5A, the message type ID method uses a specific field of a message for an ID indicating the message type. The calculating unit 331 and the detecting unit 34 then sort messages according to message IDs. In the example in FIG. 5A, "AP020S001" in the specific field of a message is an ID indicating the message type, that is, "AP020S001" is a message type ID.

FIG. 5B is a diagram of another exemplary message sorting method (a regular expression method). As illustrated in FIG. 5B, the regular expression method includes regular expressions that identify message types on a message dictionary. The calculating unit 331 and the detecting unit 34 then compare an inputted message with the regular expressions in the message dictionary to sort the message.

FIG. 5C is a diagram of still another exemplary message sorting method (a similarity determination method). As illustrated in FIG. 5C, the similarity determination method includes messages learned from the message log 361 in the past in a learning dictionary. The calculating unit 331 and the detecting unit 34 then compare an inputted message with the character strings of the messages on the learning dictionary, and as a result of comparison, the calculating unit 331 and the detecting unit 34 sort the inputted message according to the similarity. In the example in FIG. 5C, an inputted message MO is compared with a message of ID "001" in the learning dictionary, and six words are matched out of nine words, that is, the similarity is 66.666%. On the other hand, the inputted message MO is compared with a message of ID "002" in the learning dictionary, and one word is matched out of nine words, that is, the similarity is 11.11%. Here, in the case where the reference value to sort messages into the same type is set to 60%, the inputted message MO is sorted in ID "001".

[Process Procedures of Generating Monitoring Information According to the Second Embodiment]

Figure 6:
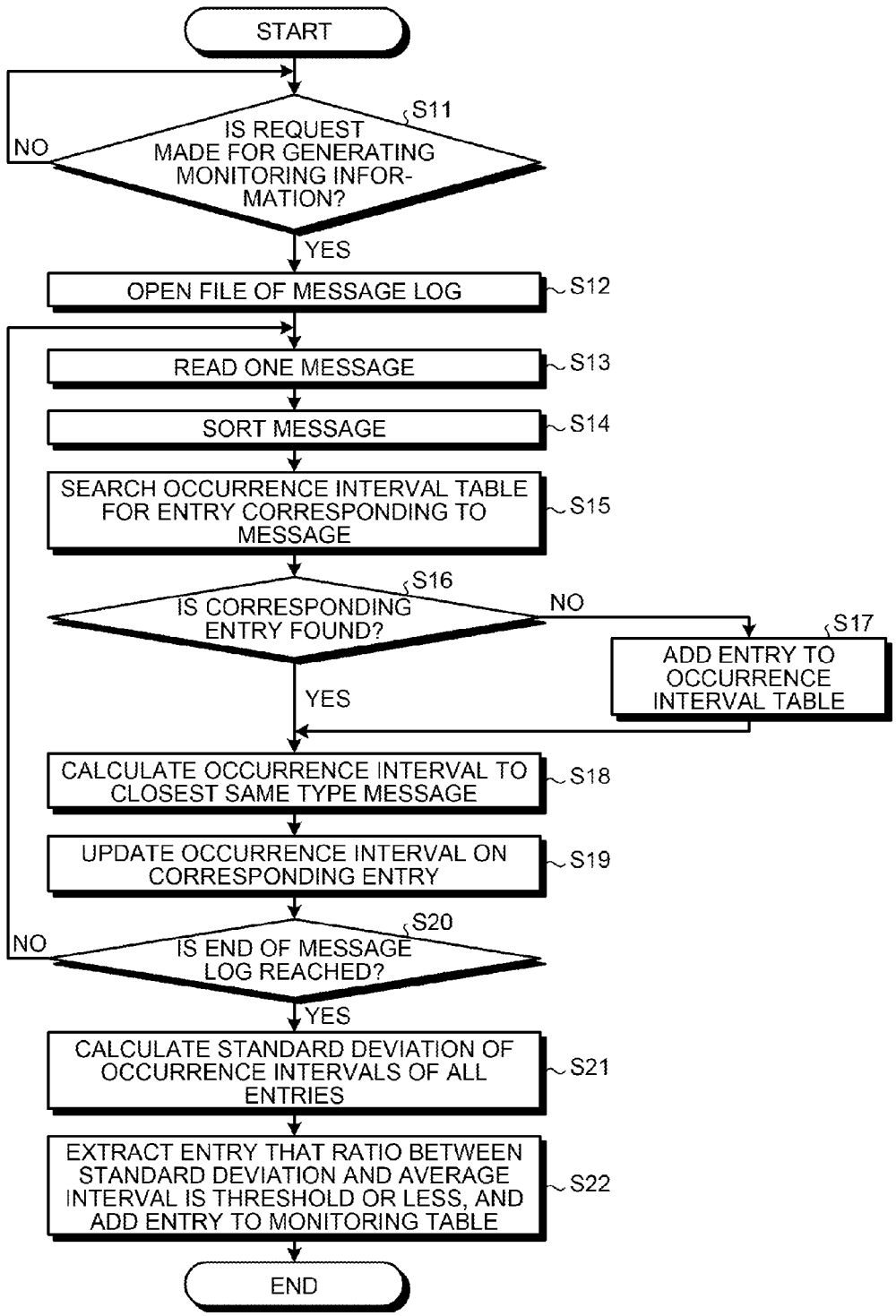
FIG. 6 is a flowchart of the process procedures of generating monitoring information according to the first embodiment.

Next, the process procedures of generating monitoring information according to the second embodiment will be described with reference to FIG. 6. FIG. 6 is a flowchart of the process procedures of generating monitoring information according to the second embodiment. It is noted that the message log 361 includes messages outputted from the devices in the network system stored by the collecting unit 32.

First, the calculating unit 331 determines whether a request is made for generating monitoring information (Step S11). In the case where the calculating unit 331 determines that a request is not made for generating monitoring information (No in Step S11), the calculating unit 331 repeats the process of determination until the calculating unit 331 determines that a request is made for generating monitoring information. On the other hand, in the case where the calculating unit 331 determines that a request is made for generating monitoring information (Yes in Step S11), the calculating unit 331 opens a file of the message log 361 (Step S12).

The calculating unit 331 then reads one message from messages stored on the message log 361 (Step S13). For example, the calculating unit 331 reads the messages stored on the message log 361 in ascending order from the oldest time instant.

Subsequently, the calculating unit 331 sorts the read message (Step S14). For example, the calculating unit 331 sorts an ID allocated to the specific field of the read message as the message type of the read message. The calculating unit 331 then searches the occurrence interval table 362 for an entry corresponding to the sorted message type (Step S15).

Here, the calculating unit 331 determines whether the corresponding entry is found (Step S16). In the case where the calculating unit 331 determines that the corresponding entry is not found (No in Step S16), the calculating unit 331 adds an entry related to the sorted message to the occurrence interval table 362 (Step S17), and goes to Step S18.

On the other hand, in the case where the calculating unit 331 determines that the corresponding entry is found (Yes in Step S16), the calculating unit 331 calculates an occurrence interval between the sorted message and the same type message closest to the sorted message based on the message log 361 (Step S18).

The calculating unit 331 then updates information related to the calculated occurrence interval on the corresponding entry (Step S19). For example, the calculating unit 331 adds one to the occurrence number in correspondence to the message type of the corresponding entry, and updates the added occurrence number. In the updating, the calculating unit 331 temporarily holds the occurrence interval on the storage unit 36 in association with the message type of the corresponding entry.

The calculating unit 331 then determines whether the end of the message log is reached (Step S20). In the case where the calculating unit 331 determines that the end of the message log is not reached (No in Step S20), the calculating unit 331 goes to Step S13 for reading the subsequent message.

On the other hand, in the case where the calculating unit 331 determines that the end of the message log is reached (Yes in Step S20), the calculating unit 331 calculates the standard deviation of the occurrence intervals of all the entries based on the entries stored on the occurrence interval table 362 (Step S21). For example, the calculating unit 331 calculates the average interval of the occurrence intervals in correspondence to the message type based on the occurrence intervals temporarily held in association with the occurrence numbers and the message types of the entries stored on the occurrence interval table 362. The calculating unit 331 then calculates the variance of the occurrence intervals in correspondence to the message type using the calculated average interval and the occurrence intervals temporarily held, and calculates the standard deviation in correspondence to the message type from the calculated variance.

Subsequently, the extracting unit 332 extracts an entry that a ratio between the standard deviation calculated for the individual message types of the entries and the average interval is a threshold or less, and adds the extracted entry to the monitoring table 363 (Step S22). "0.1" indicating 10% of the average interval is adapted to the threshold, for example. However, the threshold is not limited to 10%.

[Process Procedures of Detecting a Fault According to the Second Embodiment]

Figure 7A:
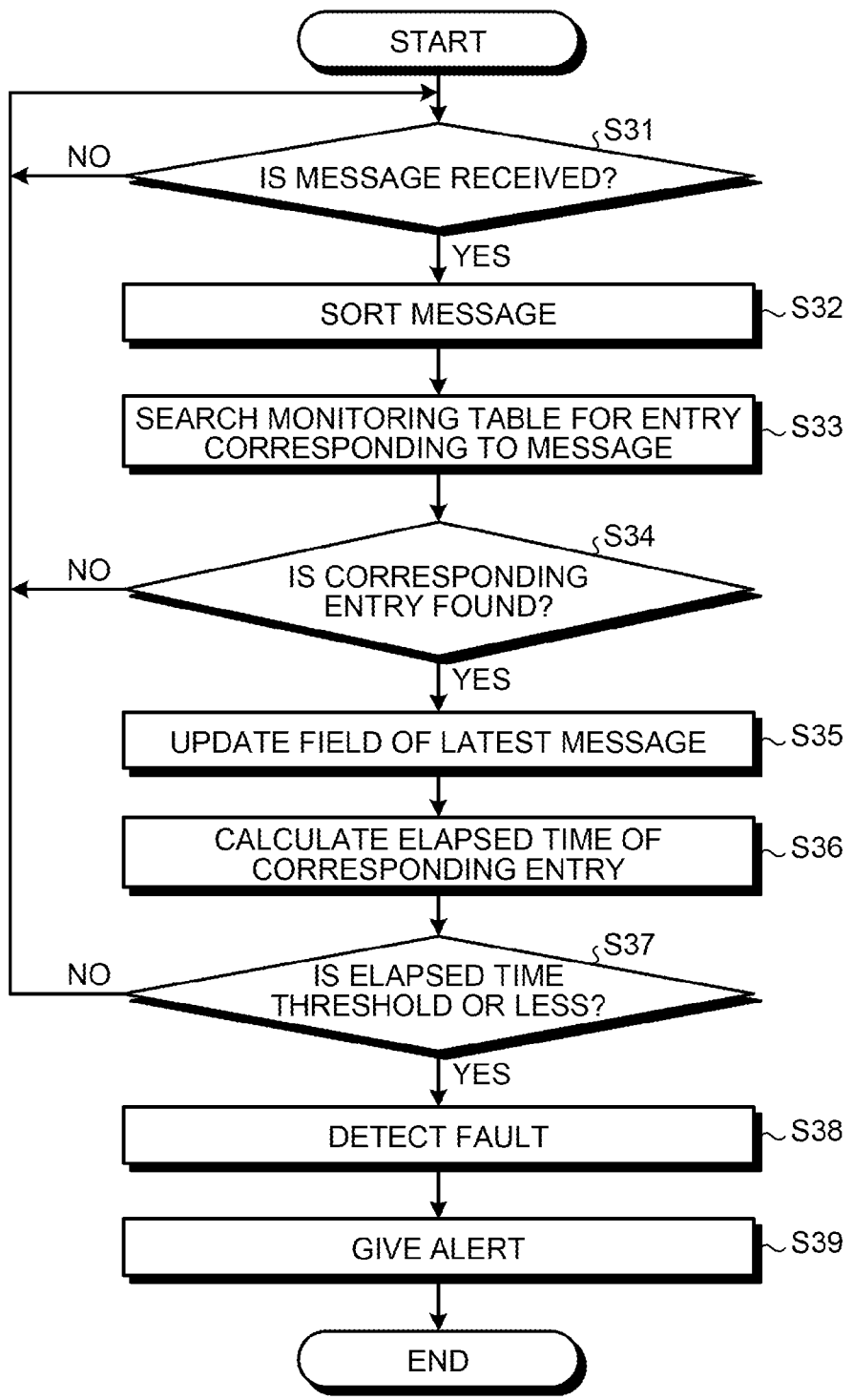
FIG. 7A is a flowchart of the process procedures of detecting a fault in the case where a message is generated in a time period shorter than a normal time period.

Next, the process procedures of detecting a fault according to the second embodiment will be described with reference to FIGS. 7A and 7B. FIG. 7A is the process procedures of detecting a fault in the case where a message is generated in a time period shorter than a normal time period. FIG. 7B is the process procedures of detecting a fault in the case where a message supposed to be generated is not generated or in the case where a message is generated after a time period longer than a normal time period.

First, the process procedures of detecting a fault in the case where a message is generated in a time period shorter than a normal time period will be described with reference to FIG. 7A. First, the detecting unit 34 determines whether to receive a message (Step S31). In the case where the detecting unit 34 determines that the detecting unit 34 does not receive a message (No in Step S31), the detecting unit 34 repeats the process of determination until the detecting unit 34 receives a message. On the other hand, in the case where the detecting unit 34 determines that the detecting unit 34 receives a message (Yes in Step S31), the detecting unit 34 sorts the received message (Step S32). For example, the detecting unit 34 sorts an ID allocated to the specific field of the received message as the message type of the received message.

The detecting unit 34 then searches the monitoring table 363 for an entry corresponding to the sorted message type (Step S33). Here, the detecting unit 34 determines whether the corresponding entry is found (Step S34). In the case where the detecting unit 34 determines that the corresponding entry is not found (No in Step S34), the detecting unit 34 goes to Step S31 because the received message is not a message targeted for monitoring.

On the other hand, in the case where the detecting unit 34 determines that the corresponding entry is found (Yes in Step S34), the detecting unit 34 updates the field of the latest message 363d on the monitoring table 363 (Step S35). Namely, the detecting unit 34 updates the field of the latest message 363d of the corresponding entry to "a circle", and updates the field of the latest message 363d of the other entries to "a dash".

The detecting unit 34 then calculates the elapsed time of the corresponding entry (Step S36). Namely, the detecting unit 34 calculates an elapsed time from a time instant of a message in the same entry closest to the time instant of the received message to the time instant of the received message. The detecting unit 34 then determines whether the calculated elapsed time is a threshold (for example, the foregoing lower limit) or less (Step S37). In the case where the detecting unit 34 determines that the elapsed time is not the threshold or less (No in Step S37), the detecting unit 34 goes to Step S31 because the message is not generated in a time period shorter than a normal time period.

On the other hand, in the case where the detecting unit 34 determines that the elapsed time is the threshold or less (Yes in Step S37), the detecting unit 34 determines that the message is generated in a time period shorter than a normal time period, and detects the case as a fault on the network system (Step S38). The alarming unit 35 then gives an alert by displaying an alert on the display or by sending an e-mail to a predetermined e-mail address, for example, according to a notice from the detecting unit 34 that a fault on the network system is detected (Step S39).

Next, the process procedures of detecting a fault in the case where a message supposed to be generated is not generated or in the case where a message is generated after a time period longer than a normal time period will be described with reference to FIG. 7B. First, the detecting unit 34 determines whether a certain time period elapses (Step S41). In the case where the detecting unit 34 determines that the certain time period does not elapse (No in Step S41), the detecting unit 34 goes to Step S41 because the detecting unit 34 waits for the certain time period. It is noted that for example, a certain time period may be one minute or five minutes. A time period matched with the device configuration of the system and the operation of the system may be applied.

On the other hand, in the case where the detecting unit 34 determines that the certain time period elapses (Yes in Step S41), the detecting unit 34 calculates the elapsed time of the entries stored on the monitoring table 363 (Step S42). For example, the detecting unit 34 calculates an elapsed time from a time instant at which the last message is generated to the present time instant using information about the messages stored on the message log 361 on the entries stored on the monitoring table 363.

The detecting unit 34 then determines whether an entry is found whose elapsed time is a threshold (for example, the foregoing upper limit) or more (Step S43). In the case where the detecting unit 34 determines that no entry is found whose elapsed time is the threshold or more (No in Step S43), the detecting unit 34 goes to Step S41 because all the entries include messages generated in a normal elapsed time.

On the other hand, in the case where the detecting unit 34 determines that an entry is found whose elapsed time is the threshold or more (Yes in Step S43), the detecting unit 34 detects the case as a fault on the network system because the message supposed to be generated is not generated on the corresponding entry (Step S44). The alarming unit 35 then gives an alert by displaying an alert on the display or by sending an e-mail to a predetermined e-mail address, for example, according to a notice from the detecting unit 34 that a fault on the network system is detected on the corresponding entry (Step S45).

As described above, the collecting unit 32 stores the messages generated on the network system on the message log 361. The extracting unit 332 then extracts a message whose occurrence interval falls within a certain range from the messages stored on the message log 361. Therefore, the extracting unit 332 extracts the message whose occurrence interval is in a certain range, so that the extracted message can be set to a message targeted for monitoring, and monitoring information can be automatically defined including messages targeted for monitoring.

Moreover, the detecting unit 34 determines whether the occurrence interval of the message extracted at the extracting unit 332 is out of a certain range in the messages generated on the network system. Therefore, in the case where the occurrence interval of the message extracted at the extracting unit 332 exceeds a certain range, the detecting unit 34 can easily detect a system fault caused by a fact that the corresponding message is not outputted, for example. Furthermore, in the case where the occurrence interval of the message extracted at the extracting unit 332 is below a certain range, the detecting unit 34 can easily detect a system fault caused by a fact that the corresponding message is outputted in a shorter time period, for example.

In addition, the extracting unit 332 sorts the message types stored on the message log 361. The extracting unit 332 then extracts the message of a type that the occurrence interval of the message falls within a certain range for the individually sorted message types. Therefore, the extracting unit 332 extracts a message in a perfect match as well as extracts a message not in a perfect match as one type of a message, so that a fault can be detected in a highly versatile manner.

Third Embodiment

In the management apparatus 1 according to the second embodiment, the case is described where the message of a type that the occurrence interval of the message falls within a certain range is extracted for a monitoring target. However, the management apparatus 1 is not limited thereto. A message pattern whose occurrence interval falls within a certain range may be extracted for a monitoring target. The message pattern referred here means a set of messages generated within a certain time period. Namely, the management apparatus 1 extracts a set of messages whose occurrence interval falls within a certain range.

Therefore, in a third embodiment, the case will be described where a management apparatus 2 extracts patterns of messages stored on the message log 361 and extracts patterns whose occurrence interval falls within a certain range as a monitoring target for the individually extracted message patterns.

[Configuration of the Management Apparatus According to the Third Embodiment]

Figure 8:
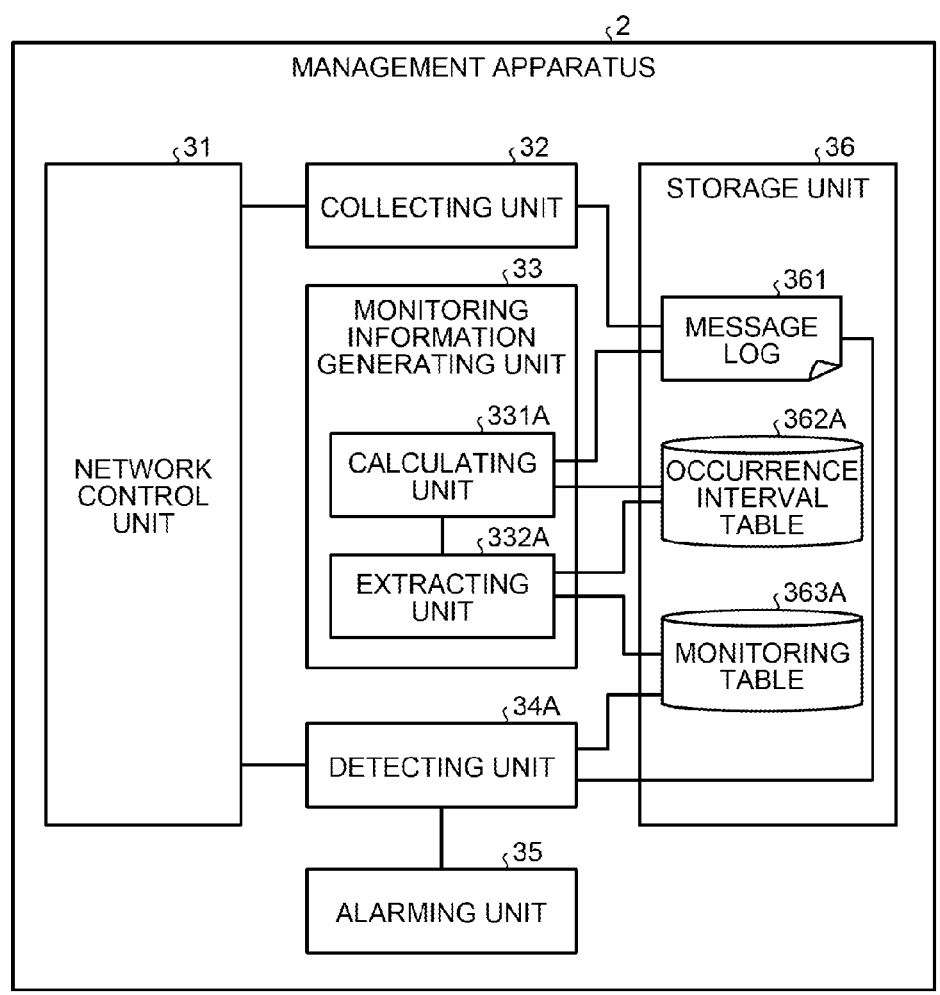
FIG. 8 is a functional block diagram of the configuration of a management apparatus according to a third embodiment.

FIG. 8 is a functional block diagram of the configuration of the management apparatus according to the third embodiment. It is noted that configurations the same as the configurations of the management apparatus 1 illustrated in FIG. 2 are designated the same reference numerals and signs, and the description of the overlapping configurations and operations is omitted. The third embodiment is different from the second embodiment in that the calculating unit 331 of the monitoring information generating unit 33 is changed to a calculating unit 331A and the extracting unit 332 is changed to an extracting unit 332A. Moreover, the third embodiment is different from the second embodiment in that the occurrence interval table 362 of the storage unit 36 is changed to an occurrence interval table 362A and the monitoring table 363 is changed to a monitoring table 363A. Furthermore, the third embodiment is different from the second embodiment in that the detecting unit 34 is changed to a detecting unit 34A.

The calculating unit 331A analyzes a message log 361, and calculates an occurrence interval for individual message patterns. For example, the calculating unit 331A selects messages stored on the message log 361 one by one, and sorts the selected messages. For example, the specific field of a message is allocated to an ID (IDentification) indicating a message type, and the calculating unit 331A sorts the ID allocated to the specific field of the selected message as the message type of the selected message. It is noted that the message sorting method is described as in FIGS. 5A to 5C, and the description is omitted.

Moreover, the calculating unit 331A extracts messages generated in a preceding certain time period from the occurrence time instant of the selected message as a pattern. It is noted that an example of a certain time period may be two minutes or may be three minutes. A time periods matched with the device configuration of the system and the system operation may be applied. Furthermore, the detail of a method for extracting messages generated in a certain time period as a pattern will be described later.

In addition, the calculating unit 331A searches the occurrence interval table 362A for an entry corresponding to the extracted pattern. In the case where the calculating unit 331A unsuccessfully searches for the entry, the calculating unit 331A then adds the entry corresponding to the selected pattern to the occurrence interval table 362A. The calculating unit 331A then calculates an occurrence interval between the extracted pattern and a pattern the same as a pattern whose occurrence time instant is the closest to the occurrence time instant of the extracted pattern based on the messages stored on the message log 361. The calculating unit 331A then updates information related to the calculated occurrence interval on the corresponding entry on the occurrence interval table 362A. For example, the calculating unit 331A adds one to the occurrence number in correspondence to the pattern of the corresponding entry, and updates the added occurrence number on the extracted pattern. In the updating, the calculating unit 331A temporarily holds the occurrence interval on the storage unit 36 in association with the pattern of the corresponding entry. This is because the calculating unit 331A extracts the pattern and calculates the occurrence interval on the messages from the beginning to the end of the message log 361 and then calculates the average interval and standard deviation of the occurrence interval of the extracted pattern.

The calculating unit 331A then repeats the processes of extracting a message pattern on the messages from the beginning to the end of the message log 361 and calculating an occurrence interval of the extracted message pattern. The calculating unit 331A processes the messages to the end of the message log 361, and then calculates the average interval of the occurrence intervals corresponding to the pattern based on the occurrence intervals temporarily held in association with the occurrence numbers and the patterns stored on the occurrence interval table 362A. Moreover, the calculating unit 331A calculates the variance of the occurrence intervals corresponding to the pattern using the occurrence intervals temporarily held in association with the calculated average intervals and the patterns, and calculates a standard deviation from the calculated variance. The calculating unit 331A then updates the calculated standard deviation on the entry of the corresponding pattern on the occurrence interval table 362A.

Figure 9:
FIG. 9 is a diagram of an exemplary data structure of an occurrence interval table according to the third embodiment.

Here, the data structure of the occurrence interval table 362A will be described with reference to FIG. 9. FIG. 9 is a diagram of an exemplary data structure of the occurrence interval table according to the third embodiment. As illustrated in FIG. 9, the occurrence interval table 362A stores a pattern content 362f, an occurrence number 362b, an average interval 362c, and a standard deviation 362d in association with individual pattern types 362e. The pattern type 362e indicates message pattern types. An ID uniquely indicating the message pattern can be used for the message pattern type 362e, for example. The pattern content 362f indicates a message type included in a pattern extracted at the calculating unit 331A. It is noted that the occurrence number 362b, the average interval 362c, and the standard deviation 362d are in a data structure the same as the data structure of the occurrence interval table 362 illustrated in FIG. 3, and the description is omitted.

Examples of records stored on the occurrence interval table 362A will be described. In the case where the pattern type 362e is "A", "a, b, c, and d" are stored for the pattern content 362f, "144" is stored for the value of the occurrence number 362b, "3,601.8" seconds is stored for the value of the average interval 362c, and "30.5" seconds is stored for the value of the standard deviation 362d.

Again referring to FIG. 8, the extracting unit 332A extracts a pattern that the occurrence interval of the pattern falls within a certain range for a monitoring target. The extracting unit 332A then stores an entry corresponding to the extracted pattern on the monitoring table 363A.

Figure 10:
FIG. 10 is a diagram of an exemplary data structure of a monitoring table according to the third embodiment.

Here, the data structure of the monitoring table 363A will be described with reference to FIG. 10. FIG. 10 is a diagram of an exemplary data structure of the monitoring table according to the third embodiment. As illustrated in FIG. 10, the monitoring table 363A stores a pattern content 363g, a partial item match 363h, an average interval 363b, a standard deviation 363c, a latest message 363d, and a last elapsed time 363e in association with individual pattern types 363f. The pattern type 363f indicates types of message patterns targeted for monitoring. An ID uniquely indicating a message pattern can be used for the pattern type 363f, for example. The pattern content 363g indicates message types included in a pattern. The partial item match 363h indicates a message type actually generated in monitoring in message types included in a pattern. It is noted that the average interval 363b, the standard deviation 363c, the latest message 363d, and the last elapsed time 363e are in a data structure the same as the data structure of the monitoring table 363 illustrated in FIG. 4, and the description is omitted.

Examples of records stored on the monitoring table 363A will be described. In the case where the pattern type 363f is "A", "a, b, c, and d" are stored for the pattern content 363g, "a, b, and c" are stored for the partial item match 363h, "3,601.8" seconds is stored for the value of the average interval 363b, and "30.5" seconds is stored for the value of the standard deviation 363c. Moreover, "a dash" is stored for the latest message 363d, and "3,680" seconds is stored for the last elapsed time 363e.

Again referring to FIG. 8, the detecting unit 34A monitors the occurrence interval of the pattern extracted at the extracting unit 332A. In the case where the occurrence interval of the extracted pattern is out of a certain range in correspondence to the extracted pattern, the detecting unit 34A detects the case as a fault on the network system. In the case where the occurrence interval is out of the certain range, the case is sorted into the case where a message pattern is generated in a time period shorter than a normal time period and the case where a message pattern supposed to be generated is not generated or the case where a message pattern is generated after a time period longer than a normal time period.

First, the case where a message pattern is generated in a time period shorter than a normal time period will be described. For example, when the detecting unit 34A receives a message, the detecting unit 34A sorts the received message using a method similar to the method for sorting messages at the calculating unit 331A. The detecting unit 34A then extracts messages generated in a preceding certain time period from the occurrence time instant of the received message as a pattern. Suppose that this certain time period has the same value as the value of a certain time period used in the case where the calculating unit 331A extracts patterns.

Moreover, the detecting unit 34A searches the monitoring table 363A for an entry corresponding to the extracted pattern. For example, the detecting unit 34A compares the content of the extracted pattern with the content of the pattern content 363g stored on the monitoring table 363A, and determines whether the patterns are the same. For example, the detecting unit 34A compares the content of the extracted pattern with the content of the pattern content 363g, and determines whether it is a perfect match or a partial item match based on the order of messages and the concordance rate of messages included in the contents. The detecting unit 34A then determines that the pattern determined as a perfect match or a partial item match is the same pattern, and searches the monitoring table 363A for the entry of the determined pattern. In the case where the pattern is a partial item match, the detecting unit 34A then updates the message type in the partial item match on the field of the corresponding entry on the partial item match 363h. Thus, the detecting unit 34A can identify an unmatched message type out of the pattern in the partial item match, so that the occurrence situations of the messages can be grasped. For example, in FIG. 10, in the case where the pattern type 363f is "A", there are the message types "a, b, c, and d" for the pattern content 363g. However, it can be identified that the message types "a, b, and c" are in the partial item match 363h and the unmatched message type is "d" out of the pattern content 363g. Therefore, for example, the detecting unit 34A can grasp that the message type "d" is not generated.

Moreover, the detecting unit 34A calculates the elapsed time of the corresponding entry based on the messages stored on the message log 361. Namely, the detecting unit 34A calculates an elapsed time from the occurrence time instant of a pattern the same as a pattern closest to the occurrence time instant of the pattern including the received message to the occurrence time instant of the pattern including the received message. It is noted that, for example, the occurrence time instant of the pattern may be the occurrence time instant of a message at the beginning end, that is, the occurrence time instant of the oldest message in the messages included in the pattern, or may be the occurrence time instant of a message at the end, that is, the occurrence time instant of the latest message.

The detecting unit 34A then determines whether the calculated elapsed time is a threshold or less. In the case where the calculated elapsed time is the threshold or less, the detecting unit 34A then detects the case as a fault on the network system because the corresponding message pattern is generated in a time period shorter than a normal time period.

Next, the case where a message pattern supposed to be generated is not generated or the case where a message pattern is generated after a time period longer than a normal time period will be described. For example, the detecting unit 34A calculates an elapsed time from the last occurrence time instant to the present time instant on the patterns of a plurality of entries stored on the monitoring table 363A using information about the messages stored on the message log 361. The detecting unit 34A then determines whether the calculated elapsed time is a threshold or more. In the case where the calculated elapsed time is the threshold or more, the detecting unit 34A then detects the case as a fault on the network system because a message pattern supposed to be generated is not generated or a message pattern is generated after a time period longer than a normal time period.

Figure 11:
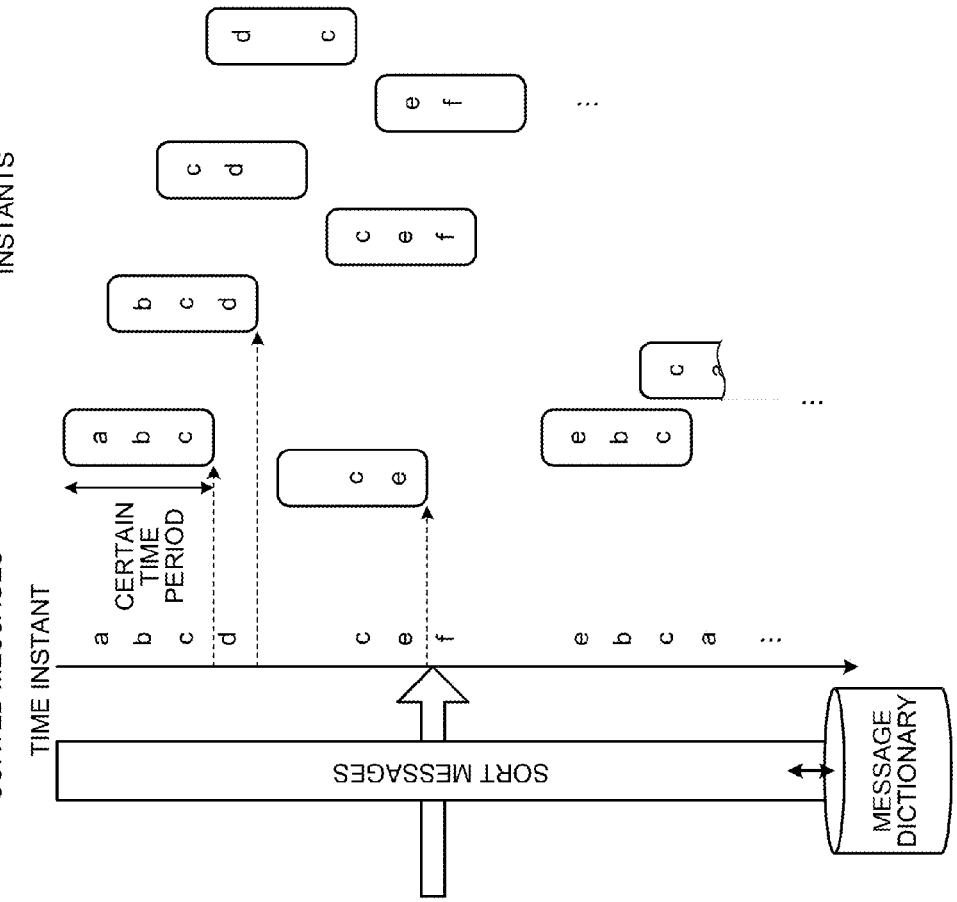
FIG. 11 is a diagram of an exemplary method for extracting messages generated in a certain time period as a pattern.

Next, a method for extracting messages generated in a certain time period as a pattern will be described with reference to FIG. 11. FIG. 11 is a diagram of an exemplary method for extracting messages generated in a certain time period as a pattern. It is noted that in the example illustrated in FIG. 11, messages are sorted according to the regular expression method illustrated in FIG. 5B. As illustrated in FIG. 11, the calculating unit 331A sorts past messages stored in the message log 361, for example, using a message dictionary. Here, as a result of sorting messages, messages are expressed in "a, b, c, d, c, e, f, e, b, c, a, and so on" in chronological order of the occurrence time instant.

The calculating unit 331A then extracts messages generated in a preceding certain time period from a certain time instant as a pattern. Here, for example, the calculating unit 331A extracts messages "a, b, and c" generated in a preceding certain time period from the occurrence time instant of the sorted message "c" as a pattern. Moreover, for another example, the calculating unit 331A extracts messages "b, c, and d" generated in a preceding certain time period from the occurrence time instant of the sorted message "d" as a pattern. Furthermore, for still another example, the calculating unit 331A extracts messages "c and e" generated in a preceding certain time period from the occurrence time instant of the sorted message "e" as a pattern.

Figure 12:
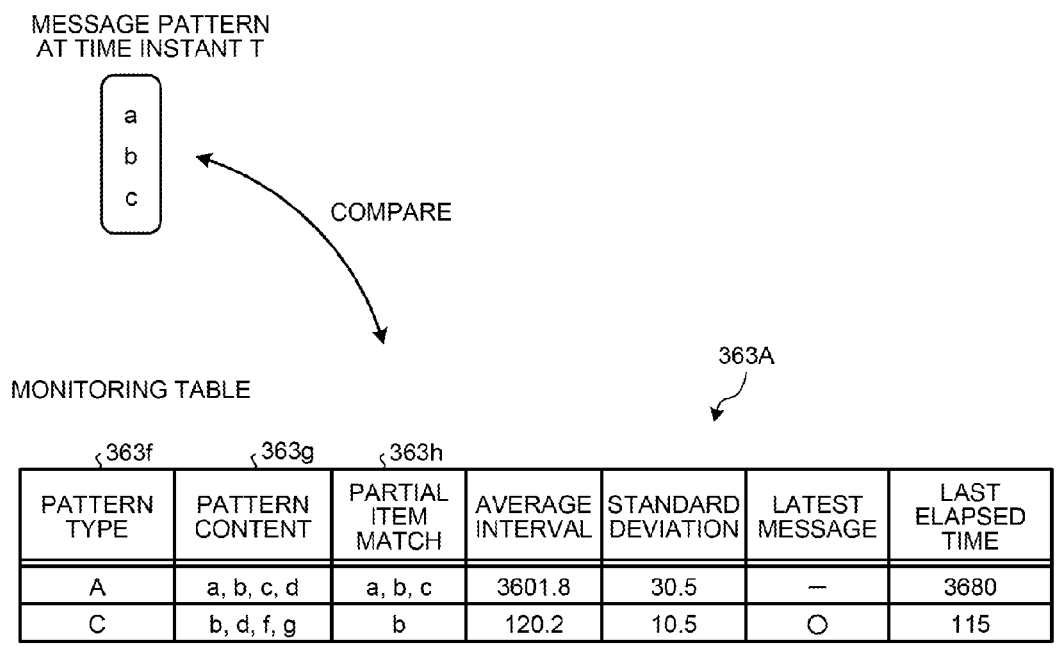
FIG. 12 is a diagram illustrative of a specific example of determining the same message patterns.

Next, a specific example of determining the same message patterns will be described with reference to FIG. 12. FIG. 12 is a diagram illustrative of a specific example of determining the same message patterns. As illustrated in FIG. 12, the case will be described where the content of a message pattern at a time instant T is "a, b, and c". It is noted that the message pattern "a, b, and c" includes types "a", "b", and "c" after messages are sorted. Thus, suppose that messages are generated in order of the message types "a", "b", and "c".

The detecting unit 34A compares the content of the message pattern at the time instant T with the content of the pattern content 363g stored on the monitoring table 363A, and determines whether the patterns are the same. Here, the detecting unit 34A compares the message pattern "a, b, and c" at the time instant T with the contents "a, b, c, and d" of the pattern content 363g for "A" in the pattern type 363f. The detecting unit 34A then determines that it is not a perfect match because the message pattern "a, b, and c" at the time instant T is included in the contents "a, b, c, and d" of the pattern type "A" in this order but the content "d" is not included in the message pattern "a, b, and c". However, suppose that the boundary of the concordance rate that the pattern is determined as a match of 70%, for example, the detecting unit 34A determines that it is a partial item match because the concordance rate of the contents is 75% in which three items are matched out of four items and the concordance rate is greater than 70%. As a result, the detecting unit 34A determines that the pattern determined as a partial item match is the same pattern. The detecting unit 34A then updates the message pattern "a, b, and c" at the time instant T on the field of the partial item match 363h where the pattern type 363f of a partial item match is "A".

[Process Procedures of Generating Monitoring Information According to the Third Embodiment]

Next, the process procedures of generating monitoring information according to the third embodiment will be described with reference to FIG. 13. FIG. 13 is a flowchart of the process procedures of generating monitoring information according to the third embodiment. It is noted that the message log 361 includes messages outputted from the devices in the network system stored by the collecting unit 32.

First, the calculating unit 331A determines whether a request is made for generating monitoring information (Step S51). In the case where the calculating unit 331A determines that a request is not made for generating monitoring information (No in Step S51), the calculating unit 331A repeats the process of determination until the calculating unit 331A determines that a request is made for generating monitoring information. On the other hand, in the case where the calculating unit 331A determines that a request is made for generating monitoring information (Yes in Step S51), the calculating unit 331A opens a file of the message log 361 (Step S52).

The calculating unit 331A then reads one message from messages stored on the message log 361 (Step S53).

Subsequently, the calculating unit 331A sorts the read message (Step S54). For example, the calculating unit 331A sorts an ID allocated a specific field of the read message as the message type of the read message. The calculating unit 331A then extracts messages generated in a past certain time period as a pattern from the occurrence time instant of the read one message (Step S55). The calculating unit 331A then searches the occurrence interval table 362A for an entry corresponding to the extracted pattern (Step S56).

Here, the calculating unit 331A determines whether the corresponding entry is found (Step S57). In the case where the calculating unit 331A determines that the corresponding entry is not found (No in Step S57), the calculating unit 331A adds the corresponding entry to the occurrence interval table 362A (Step S58), and goes to Step S59.

On the other hand, in the case where the calculating unit 331A determines that the corresponding entry is found (Yes in Step S57), the calculating unit 331A calculates an occurrence interval between the extracted pattern and a pattern the same as a pattern whose occurrence time instant is the closest to the occurrence time instant of the extracted pattern based on the message log 361 (Step S59).

The calculating unit 331A then updates information related to the calculated occurrence interval on the corresponding entry (Step S60). For example, the calculating unit 331A adds one to the occurrence number in correspondence to the pattern of the corresponding entry, and updates the added occurrence number. In the updating, the calculating unit 331A temporarily holds the occurrence interval on the storage unit 36 in association with the pattern of the corresponding entry.

The calculating unit 331A then determines whether the end of the message log is reached (Step S61). In the case where the calculating unit 331A determines that the end of the message log is not reached (No in Step S61), the calculating unit 331A goes to Step S53 for reading the subsequent message.

On the other hand, in the case where the calculating unit 331A determines that the end of the message log is reached (Yes in Step S61), the calculating unit 331A calculates the standard deviation of the occurrence intervals of all the entries based on the entries stored on the occurrence interval table 362A (Step S62). For example, the calculating unit 331A calculates the average interval of the occurrence intervals corresponding to the pattern based on the occurrence intervals temporarily held in association with the occurrence number and the entry pattern stored on the occurrence interval table 362A. The calculating unit 331A then calculates the variance of the occurrence intervals corresponding to the pattern using the occurrence intervals temporarily held in association with the calculated average interval and the entry pattern, and calculates the standard deviation corresponding to the pattern from the calculated variance.

Subsequently, the extracting unit 332A extracts an entry that a ratio between the standard deviation and the average interval calculated for the individual entry patterns is a threshold or less, and adds the entry to the monitoring table 363A (Step S63). "0.1" indicating 10% of the average interval is adapted to the threshold, for example. However, the threshold is not limited to 10%.

[Process Procedures of Detecting a Fault According to the Third Embodiment]

Figure 14A:
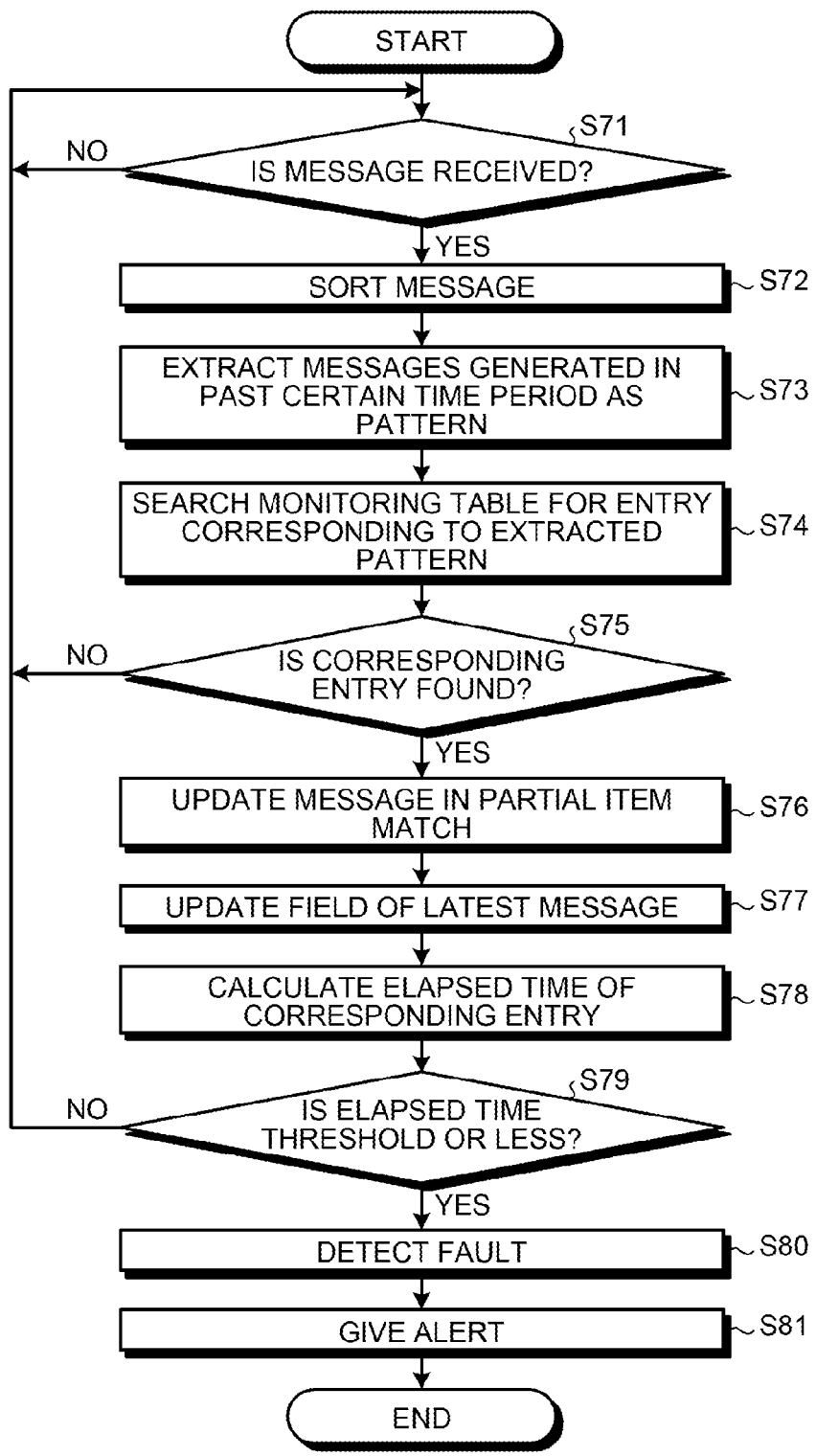
FIG. 14A is a flowchart of the process procedures of detecting a fault in the case where a message is generated in a time period shorter than a normal time period.
Figure 14B:
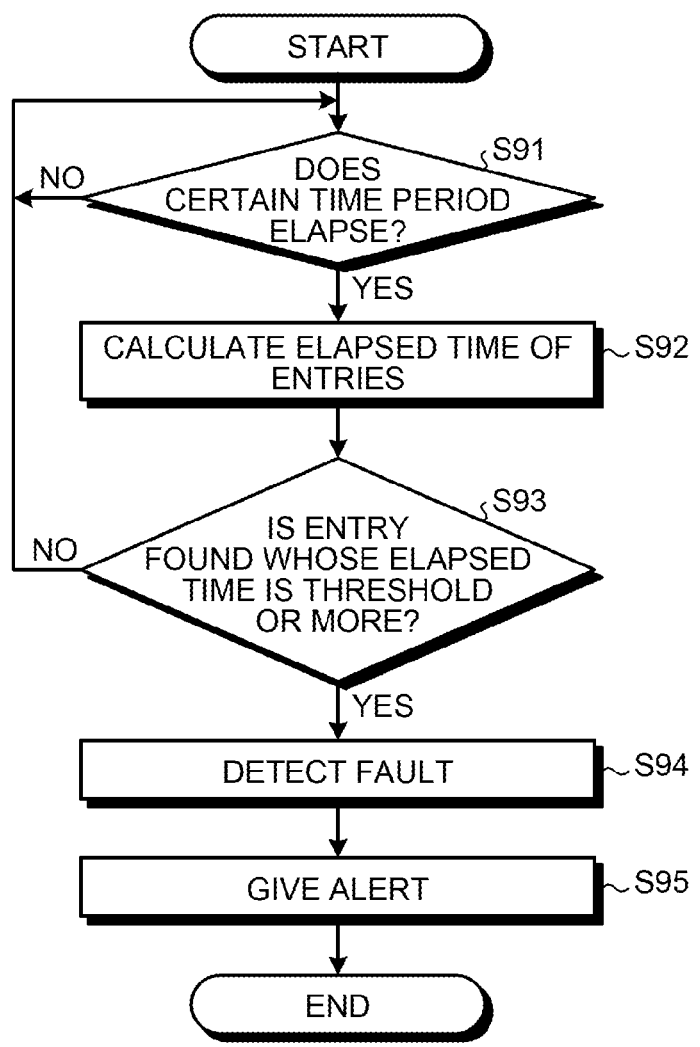
FIG. 14B is a flowchart of the process procedures of detecting a fault in the case where a message supposed to be generated is not generated or in the case where a message is generated after a time period longer than a normal time period.

Next, the process procedures of detecting a fault according to the third embodiment will be described with reference to FIGS. 14A and 14B. FIG. 14A is the process procedures of detecting a fault in the case where a message pattern is generated in a time period shorter than a normal time period. FIG. 14B is the process procedures of detecting a fault in the case where a message pattern supposed to be generated is not generated or in the case where a message pattern is generated after a time period longer than a normal time period.

First, the process procedures of detecting a fault in the case where a message pattern is generated in a time period shorter than a normal time period will be described with reference to FIG. 14A. First, the detecting unit 34A determines whether to receive a message (Step S71). In the case where the detecting unit 34A determines that the detecting unit 34A does not receive a message (No in Step S71), the detecting unit 34A repeats the process of determination until the detecting unit 34A receives a message. On the other hand, in the case where the detecting unit 34A determines that the detecting unit 34A receives a message (Yes in Step S71), the detecting unit 34A sorts the received message using a method similar to the method for sorting messages at the calculating unit 331A (Step S72).

The detecting unit 34A then extracts messages generated in a past certain time period from the occurrence time instant of the received message as a pattern (Step S73). The detecting unit 34A then searches the monitoring table 363A for an entry corresponding to the extracted pattern (Step S74).

Here, the detecting unit 34A determines whether the corresponding entry is found (Step S75). In the case where the detecting unit 34A determines that the corresponding entry is not found (No in Step S75), the detecting unit 34A goes to Step S71 because the pattern of the corresponding entry is not a pattern targeted for monitoring.

On the other hand, in the case where the detecting unit 34A determines that the corresponding entry is found (Yes in Step S75), the detecting unit 34A compares the content of the extracted pattern with the content of the pattern content 363g of the corresponding entry, and determines whether it is a perfect match or a partial item match. In the case where the pattern is a partial item match, the detecting unit 34A then updates the message type in the partial item match on the field of the corresponding entry on the partial item match 363h (Step S76). Moreover, the detecting unit 34A updates the field of the latest message 363d on the monitoring table 363A (Step S77). Namely, the detecting unit 34A updates the field of the latest message 363d of the corresponding entry to "a circle", and updates the field of the latest message 363d of the other entries to "a dash".

The detecting unit 34A then calculates the elapsed time of the corresponding entry (Step S78). Namely, the detecting unit 34A calculates an elapsed time from the occurrence time instant of a pattern the same as a pattern closest to the occurrence time instant of the pattern including the received message to the occurrence time instant of the pattern including the received message.

The detecting unit 34A then determines whether the calculated elapsed time is a threshold (for example, the foregoing lower limit) or less (Step S79). In the case where the detecting unit 34A determines that the elapsed time is not the threshold or less (No in Step S79), the detecting unit 34A goes to Step S71 because the message pattern is not generated in a time period shorter than a normal time period.

On the other hand, in the case where the detecting unit 34A determines that the elapsed time is the threshold or less (Yes in Step S79), the detecting unit 34A detects the case as a fault on the network system because the message pattern is generated in a time period shorter than a normal time period (Step S80). The alarming unit 35 then gives an alert by displaying an alert on the display or by sending an e-mail to a predetermined e-mail address, for example, according to a notice from the detecting unit 34A that a fault on the network system is detected (Step S81).

Next, the process procedures of detecting a fault in the case where a message pattern supposed to be generated is not generated or in the case where a message pattern is generated after a time period longer than a normal time period will be described with reference to FIG. 14B. First, the detecting unit 34A determines whether a certain time period elapses (Step S91). In the case where the detecting unit 34A determines that the certain time period does not elapse (No in Step S91), the detecting unit 34A goes to Step S91 because the detecting unit 34A waits for the certain time period.

On the other hand, in the case where the detecting unit 34A determines that the certain time period elapses (Yes in Step S91), the detecting unit 34A calculates the elapsed time of the entries stored on the monitoring table 363A (Step S92). For example, the detecting unit 34A calculates an elapsed time from a time instant at which the last message is generated to the present time instant using information about the messages stored on the message log 361 on the entries stored on the monitoring table 363A.

The detecting unit 34A then determines whether an entry is found whose elapsed time is a threshold (for example, the foregoing upper limit) or more (Step S93). In the case where the detecting unit 34A determines that no entry is found whose elapsed time is the threshold or more (No in Step S93), the detecting unit 34A goes to Step S91 because all the entries include the message pattern in a normal elapsed time.

On the other hand, in the case where the detecting unit 34A determines that an entry is found whose elapsed time is the threshold or more (Yes in Step S93), the detecting unit 34A detects the case as a fault on the network system because a message pattern supposed to be generated is not generated on the corresponding entry (Step S94). The alarming unit 35 then gives an alert by displaying an alert on the display or by sending an e-mail to a predetermined e-mail address, for example, according to a notice from the detecting unit 34A that a fault on the network system is detected on the corresponding entry (Step S95).

It is possible to detect an abnormality on a system.

As described above, the collecting unit 32 stores the message generated on the network system on the message log 361. The extracting unit 332A then extracts a pattern of messages generated within a certain time period from a predetermined time instant on the messages stored on the message log 361. The extracting unit 332A then extracts a message pattern that the occurrence interval of the pattern falls within a certain range on the extracted message patterns individually. Therefore, the extracting unit 332A extracts the message pattern whose occurrence interval falls within a certain range, so that the extracted pattern can be set to a pattern targeted for monitoring, and the rules on the operation can be automatically defined including the patterns targeted for monitoring.

Moreover, the detecting unit 34A determines whether the occurrence interval is out of a certain range on the pattern of the messages extracted at the extracting unit 332A in the messages generated on the network system. Therefore, in the case where the occurrence interval exceeds a certain range on the pattern of the messages extracted at the extracting unit 332A, the detecting unit 34A can easily detect a system fault caused by a fact that the corresponding message pattern is not outputted, for example. Furthermore, in the case where the occurrence interval is below a certain range on the pattern of the messages extracted at the extracting unit 332A, the detecting unit 34A can easily detect a system fault caused by a fact that the corresponding message pattern is outputted in a shorter time period, for example.

[Program and Others]

It is noted that the functions of the collecting unit 32, the monitoring information generating unit 33, the detecting units 34 and 34A, and the alarming unit 35 can be implemented by an integrated circuit such as an ASIC (Application Specific Integrated Circuit) and an FPGA (Field Programmable Gate Array), for example. Moreover, the functions can be implemented by a predetermined program to function the CPU (Central Processing Unit).

Furthermore, the management apparatuses 1 and 2 can be implemented by mounting the functions of the foregoing collecting unit 32, the monitoring information generating unit 33, the detecting units 34 and 34A, and so on, on an information processing apparatus such as a known personal computer and a known workstation.

In addition, the components of the apparatuses illustrated in the drawings are not necessarily physically configured as in the drawings. Namely, the specific modes of the distribution and integration of the apparatuses are not limited to ones illustrated in the drawings. All or a part of the apparatuses can be configured as functionally or physically distributed or integrated in given units according to various loads and the use situations, for example. For example, the calculating unit 331 and the extracting unit 332 may be integrated as a single unit. On the other hand, the detecting unit 34 may be distributed into a detecting unit used in the case where a message is generated in a time period shorter than a normal time period and a detecting unit used in the case where a message supposed to be generated is not generated or in the case where a message is generated after a time period longer than a normal time period. Moreover, the storage unit 36 including the message log 361 and the occurrence interval table 362 may be connected as an external device of the management apparatus 1 via a network.

Furthermore, various processes described in the forgoing embodiments can be implemented by executing a program prepared beforehand on a computer such as a personal computer and a workstation. Therefore, in the following, an exemplary computer that has functions similar to the functions of the management apparatus 1 illustrated in FIG. 2 and executes a message determination program will be described with reference to FIG. 15.

Figure 15:
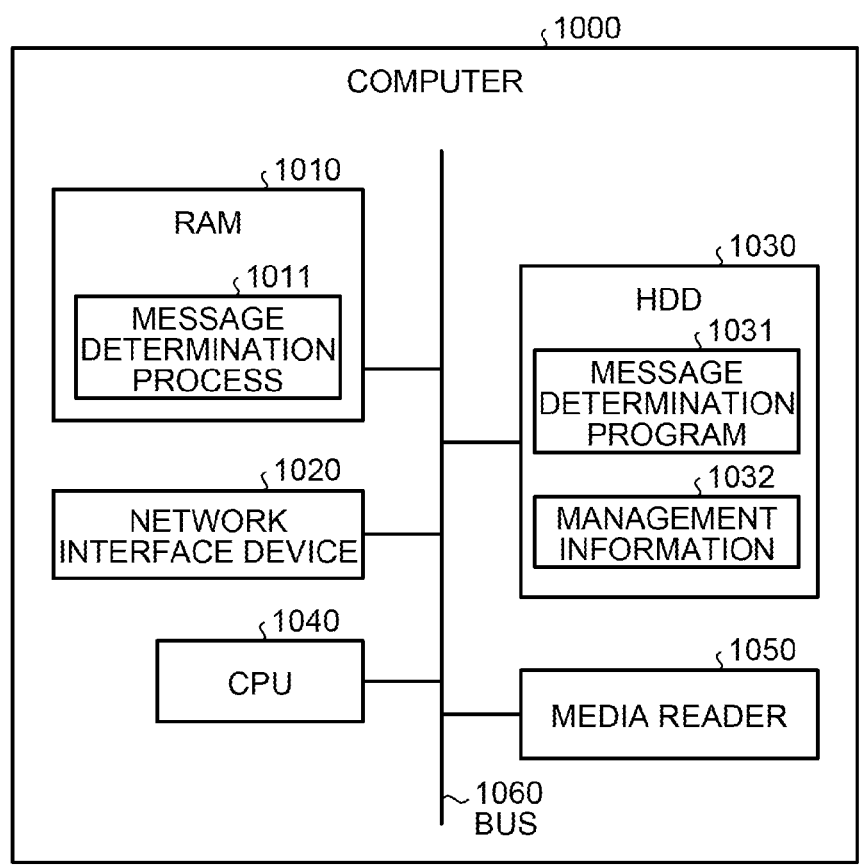
FIG. 15 is a diagram of a computer that executes a message determination program.

FIG. 15 is a diagram of a computer that executes a message determination program. As illustrated in FIG. 15, a computer 1000 includes a RAM (Random Access Memory) 1010, a network interface device 1020, a HDD 1030, a CPU (Central Processing Unit) 1040, a media reader 1050, and a bus 1060. The RAM 1010, the network interface device 1020, the HDD 1030, the CPU 1040, and the media reader 1050 are connected to each other through the bus 1060.

The HDD 1030 stores a message determination program 1031 including functions similar to the functions of the collecting unit 32, the monitoring information generating unit 33, and the detecting unit 34 illustrated in FIG. 2. Moreover, the HDD 1030 stores management information 1032 corresponding to the message log 361, the occurrence interval table 362, and the monitoring table 363 illustrated in FIG. 2.

The CPU 1040 reads the message determination program 1031 out of the HDD 1030, and loads the message determination program 1031 on the RAM 1010, and the message determination program 1031 functions as a message determination process 1011. The message determination process 1011 loads information, for example, read out of the management information 1032 on a region allocated to the message determination process 1011 on the RAM 1010 appropriately, and executes the processing of various items of data based on the loaded data, for example.

It is noted that the foregoing message determination program 1031 is not necessarily stored on the HDD 1030. Such a configuration may be possible in which the message determination program 1031 is stored on "a portable physical medium" such as a CD-ROM and read and executed by the computer 1000.

Furthermore, the message determination program 1031 may be stored on a different computer (or a server), for example, connected to the computer 1000 via a public network, the Internet, a LAN (Local Area Network), a WAN (Wide Area Network), etc. In this case, the computer 1000 reads and executes the message determination program 1031 via these networks.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus for detecting abnormality of a system comprising:
   a processor;
   a memory, wherein the processor executes:
      storing messages generated in the system;
      calculating an occurrence interval of each of the stored messages, and calculating the average interval and standard deviation of the calculated occurrence intervals;
      specifying a message to be targeted whose occurrence interval is in a certain range based on the calculated average interval and standard deviation; and
      upon receiving a message which is the same as the specified message and which is generated in the system, determining whether an occurrence interval of the received message is out of the certain range from the occurrence interval of the specified messages.

2. The apparatus according to claim 1, wherein:
   the specifying includes sorting the stored messages, and specifying a type of a message to be targeted whose occurrence interval is in a certain range from message types obtained by sorting; and
   the determining includes determining, upon receiving a type of a message which is the same as the specified type of the message generated in the system, whether the occurrence interval of the type of the received message is out of the certain range.

3. The apparatus according to claim 1, wherein:
   the specifying includes specifying a set of messages to be targeted whose occurrence interval is in a certain range from the messages stored at the storing; and
   the determining includes determining whether the occurrence interval of the set of the received message is out of the certain range.

4. The apparatus according to claim 1, wherein:
   the specifying includes specifying the message in certain time periods or at irregular intervals; and
   the determining includes determining whether an occurrence interval of the received message is out of the certain range.

5. The apparatus according to claim 1, wherein the specifying specifies a message to be targeted whose variation in the occurrence interval is in a certain range.

6. A non-transitory computer-readable recording medium having stored therein a program for causing a computer to execute a message determination process comprising:
   calculating an occurrence interval of each of a message from a storage unit that stores messages generated in a system, and calculating the average interval and standard deviation of the calculated occurrence intervals;
   specifying a message to be targeted whose occurrence interval is in a certain range based on the calculated average interval and standard deviation; and
   upon receiving a message which is the same as the specified message and which is generated in the system, determining whether an occurrence interval of the received message is out of the certain range from the occurrence interval of the specified messages.

* * * * *